March 13, 1956 G. C. STURGES ET AL 2,737,744
INSTRUMENT LIGHTING
Filed April 9, 1952
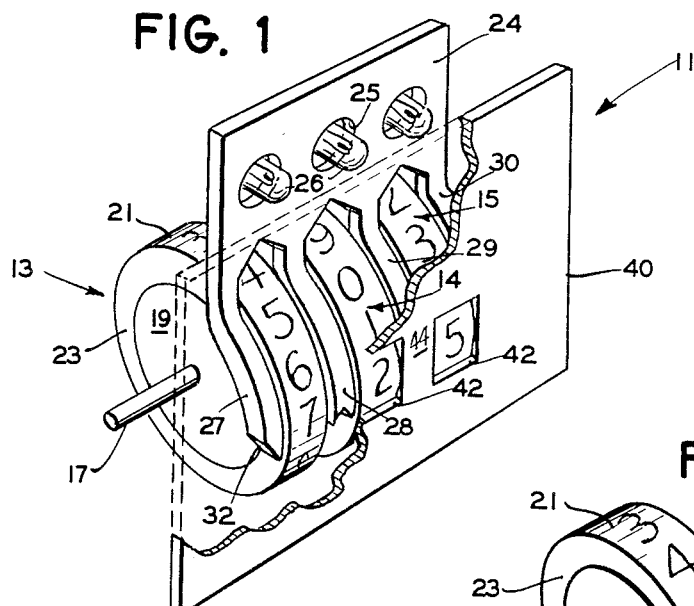
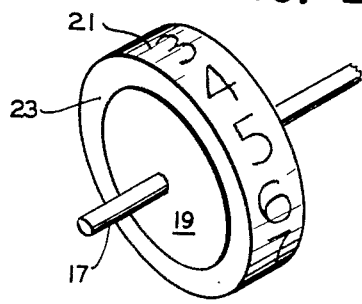
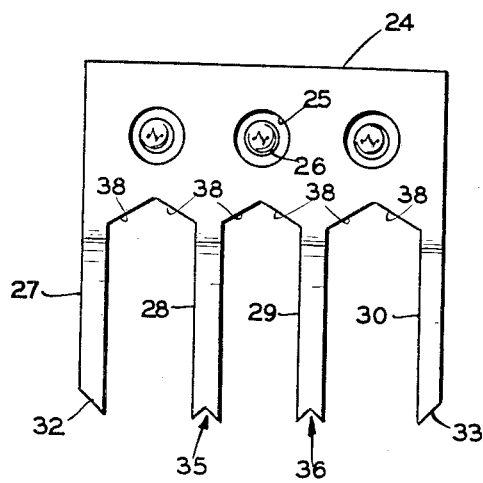
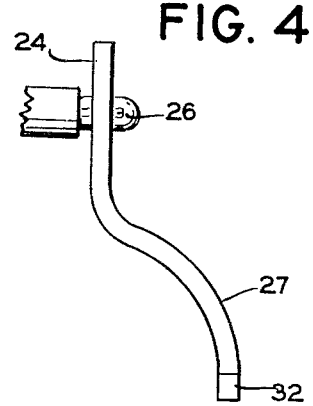
INVENTORS
GEORGE C. STURGES
LEONARD B. KELLY
BY C. R. Miranda
ATTORNEY sides (Figs. 3 and 4). Plate 24 has openings 25 formed
United States Patent Office 2,737,744
Patented Mar. 13, 1956

2,737,744

INSTRUMENT LIGHTING

George C. Sturges, Bergenfield, and Leonard B. Kelly, Paramus, N. J., assignors to Bendix Aviation Corporation, Teterboro, N. J., a corporation of Delaware Application April 9, 1952, Serial No. 281,324

11 Claims. (Cl. 40—130.5)

This invention in general relates to indicating instruments and more particularly to the illumination of counter type indicating instruments.

Proper illumination of indicating instruments, which are used in control compartments of mobile craft, becomes exceedingly important where a very low level of illumination must be maintained in the compartment and the operator must control the craft under "night-vision" conditions. In spite of the low general illumination level in the compartment, the instruments must be adequately illuminated so that the craft may be properly handled. This requirement is generally satified by some method of internal lighting. It is important in these cases that the amount of light which escapes from the instrument should be held to an absolute minimum, if not eliminated entirely.

There have been several satisfactory methods of illumination for dial-type instruments and these include ring lighting of an acrylic resin dial face wherein illumination of the indicia is obtained from the interior of the dial by taking advantage of the light piping characteristics of acrylic resins. When, however, the information to be presented is by a counter type instrument, the problem of proper illumination is not readily solved. In this case, the problem involves illuminating large moving parts of cylindrical shape, providing for reasonably even illumination of the several parts, and preventing the escape of stray light into the compartment.

The present invention, therefore, contemplates novel means for illuminating a counter type indicating instrument wherein a plurality of counter drums made from transparent colorless material are arranged side by side. Interposed between the counters are depending fingers or prongs integral with a light transmitting plate made from the same material as the drums. The fingers are substantially arcuately shaped and extend along the peripheral edges of the drums. Formed on the ends of the fingers are beveled light reflecting surfaces which direct light rays, received from light admitting surfaces of the plate, into the counter drums to illuminate the indicia thereof. The edges of the plate adjacent the juncture of the fingers with the plate are formed so as to funnel the light rays into the fingers.

An object of the present invention, therefore, is to provide novel means for effectively illuminating the indicia of counter type indicating instruments.

Another object is to provide novel means for illuminating the indicia of indicating counter drums arranged side by side.

A further object is to provide a novel light conducting plate for illuminating the indicia of transparent indicating counters wherein light conducting fingers or prongs integral with the plate are interposed between the counters to illuminate the indicia.

Still another object is to provide novel means for illuminating the indicia of indicating counters by interposing light conducting members adjacent the peripheral edges of the counters whereby beveled light reflecting surfaces formed on the members direct light rays into the counters to illuminate the indicia thereof.

The above and other objects and advantages of the present invention will appear more fully hereinafter from a consideration of the detailed description which follows taken together with the accompanying drawing wherein one embodiment of the invention is illustrated.

In the drawing, wherein like reference characters refer to like parts throughout the several views;

Fig. 1 is an isometric view, in elevation, of one form of an indicating instrument embodying the present invention;

Fig. 2 is an isometric view, in elevation, of a counter wheel employed with the indicating instrument of Fig. 1;

Fig. 3 is a front elevational view of the light conducting plate of Fig. 1; and

Fig. 4 is a side elevational view of the light conducting plate.

Referring now to the drawing for a more detailed description of the present invention, and more particularly to Fig. 1 wherein one embodiment hereof is clearly illustrated, an indicating instrument, generally designated by the numeral 11, and containing only those elements necessary for an understanding of the present invention, is shown as comprising three spaced indicating counter wheels 13, 14 and 15 mounted side by side for rotation on a shaft 17. Counter wheels 13, 14 and 15 each comprises a metallic disc 19 fastened to both sides thereof, by means not shown, and an opening provided at the center of the discs permits insertion of shaft 17 therethrough. Counter wheel 15 is secured to the shaft by any suitable means while counter wheels 13 and 14 are loosely mounted on the shaft. A conventional Geneva gearing (not shown) is arranged between fixedly mounted counter wheel 15 and counter wheels 13 and 14 whereby angular displacement of shaft 17 in response to changes in the condition to be indicated by instrument 11, effects rotation of the other counter wheels at a predetermined ratio. Further description of the means interconnecting the counter wheels for rotation is not believed necessary, inasmuch as it does not form any part of the present invention and the construction thereof will be apparent to those skilled in the art.

Counter wheels 13, 14 and 15 each includes a cylindrical ring-drum 21 made of colorless transparent material, such as an acrylic resin, for example, the latter having peripheral, light re-entrant, input edge surfaces 23. The peripheral surface of ring-drum 21 is provided with indicia (Fig. 2) distributed in the usual manner around the drum, such indicia being capable of illumination by any known suitable treatment of the drum rendering the background substantially opaque and the indicia translucent so as to be illuminated by light distributed through the drum by internal reflection. Preferably the peripheral surface of drum 21 is engraved and then uniformly sprayed with a translucent coating. Afterwards, the peripheral surface is coated with black paint or printer's ink applied by rolling in order to avoid coating the engraved indicia. The drum is then baked at a low temperature to harden the black coating. Other methods for forming the indicia may be used, such as photoengraving, as long as the indicia are translucent white on a matte black finish. The inner surface of drum 21 is coated with a translucent white paint so as to reflect light rays toward the indicia.

Suitably mounted adjacent counter wheels 13, 14 and 15 by means not shown, is a light conducting plate 24 of transparent colorless acrylic resin highly polished on all sides (Figs. 3 and 4). Plate 24 has openings 25 formed therein, each of which accommodates a source of illumination such as electric lamps 26, whereby the walls of the openings, in effect, define light admitting surfaces.

Lamps 26 are so placed within openings 25 that their filaments are located intermediate the front and rear walls of plate 24. Formed integrally with plate 24 are arcuately shaped depending fingers or prongs 27, 28, 29 and 30 which are spaced apart a predetermined distance sufficient to accommodate the counter wheels therebetween. The depending fingers extend along a portion of the peripheral edges of drums 21 and in alignment therewith, the outer surfaces of fingers being flush with the peripheral surfaces of the drums. The ends of fingers 27 and 30 are provided with beveled light reflecting surfaces 32 and 33, respectively, for directing light rays from lamps 26 into end counters 13 and 15, respectively. While a bevel of 45 degrees is well suited for the purposes of this invention, other desired inclinations may be utilized. Intermediate finger 28, which is common to end counter 13 and counter 14, has a dovetail light reflecting surface 35 which comprises two beveled surfaces lying in intersecting planes. Similarly, intermediate finger 29 which is common to intermediate counter 14 and end counter 15, also has a dovetail light reflecting surface designated by the numeral 36, the latter comprising two beveled surfaces lying in intersecting planes. The angles of inclination of the two sides of the dovetail surfaces 35 and 36 may be 45 degrees or some other selected value. With the foregoing arrangement, light rays from lamps 26 are directed by dovetail surface 35 into end counter 13 and counter 14, while dovetail surface 36 directs light rays into counter 14 and end counter 15.

Plate 24 has funnelling edges 38 formed adjacent the juncture of the fingers with the plate and immediately below openings 25, which serve to concentrate and funnel light rays from lamps 26 into the depending fingers. Intermediate fingers 28 and 29 each receive light rays from two lamps while the end fingers 27 and 30 each receive light rays only from a single lamp. In order to equalize the illumination of the indicia so that the concentration of light rays on each side of the drums are substantially equal, the slope of the funnelling edges adjacent the end fingers are given a lesser slope than that adjacent the intermediate fingers. In this way, a larger funnelling area is provided adjacent the end fingers whereby the light funnelled into the latter fingers will be substantially equal to the light rays in the intermediate fingers which receive light from two lamps. Thus, the indicia of all three counter wheels are uniformly illuminated.

Positioned in front of and closely adjacent the fingers is a front panel cover 40 having openings 42, only two of which are shown in Fig. 1, for viewing the indicia on the counter wheels. The rib sections 44 between openings 42 are positioned directly over the fingers and are machined to the contour of the fingers. In this manner, light between the re-entrant positions of the drums and the fingers is prevented from reaching the eyes of an observer. Cover 40 forms part of a housing (not shown) which contains the counter and light transmitting assemblies, it being understood that the housing is constructed whereby light cannot escape externally thereof.

It will now be understood that the light rays from lamps 26 enter plate 24 and are transmitted therethrough to be funnelled by edges 38 into fingers 27, 28, 29 and 30. Light reflecting surfaces 32, 33, 35 and 36 direct the light rays from their respective fingers into their associated counters to illuminate the indicia appearing in openings 42. The lamps are located so that the filaments are positioned within plate 24 to thereby effect the maximum light entering the plate.

It will now be readily apparent that the present invention provides novel illumination means whereby even illumination of large moving parts of cylindrical shape is effected. By providing a counter type indicating instrument with transparent counter wheels illuminated from depending light conducting fingers arranged along the peripheral edges of the counters, an indicating counter arrangement is obtained wherein the indicia are brightly illuminated.

Although one embodiment of the invention has been illustrated and described in detail, it is to be expressly understood that the invention is not limited thereto. Various changes can be made in the design and arrangement of parts without departing from the spirit and scope of the invention as the same will now be understood by those skilled in the art.

We claim:
1. In combination, a cylindrical transparent member having indicia formed on the peripheral surface thereof, a light conducting member arranged on each side of said cylindrical member and extending partially along the opposite peripheral edges thereof, a common light admitting surface for said light conducting members, and a light emitting surface formed on each of said light conducting members adjacent said cylindrical member whereby light rays received at said light admitting surface are conducted through said light conducting members and through said light emitting surfaces into said cylindrical member to illuminate the indicia thereof.

2. In combination, a light-conducting member having a peripheral indicia-bearing portion, a pair of light conducting elements disposed on opposite sides of said portion so as to receive said portion therebetween and extending along at least part of the peripheral edges of said portion, said light-conducting elements having a common light-admitting portion, each light conducting element having a light-emitting surface formed adjacent said indicia-bearing portion so that light rays received at said light-admitting portion and transmitted through said light-conducting elements are transmitted through said light-emitting surfaces into said indicia-bearing portion to illuminate the indicia thereon.

3. In combination, a light-conducting member having a peripheral indicia-bearing portion, a second light-conducting member having a light-admitting surface and a pair of depending fingers which receive said portion therebetween and receive light from said surface, each finger having a light-reflecting surface and a light-emitting surface formed adjacent said portion so that light rays received at said light-admitting surface and transmitted through said second light-conducting member and said fingers are directed through said light-emitting surfaces into said indicia-bearing portion to illuminate the indicia thereon.

4. In combination, a cylindrical light-conducting member having indicia on its outer peripheral surface, a second light-conducting member having a light-admitting surface and having a pair of light-conducting arcuate portions adapted to receive light passing through said light-admitting surface and spaced on opposite sides of said cylindrical member along the axis of said cylindrical member, said arcuate portions extending along at least a portion of the opposed outer peripheral edges of said cylindrical member, each of said arcuate portions having a light-emitting surface disposed adjacent to the cylindrical member whereby light rays received at said light-admitting surface are transmitted through said second member and said arcuate portions and out through said light-emitting surfaces into said cylindrical member to illuminate the indicia thereon.

5. The combination according to claim 4 wherein each of said arcuate portions has at its end adjacent to its light-emitting surface a beveled reflecting surface to reflect light rays through said light-emitting surface to illuminate said indicia.

6. In combination, a cylindrical light-conducting indicator member having indicia on its outer peripheral surface, a second light-conducting member having an aperture formed therein for accommodating a source of illumination, the wall of the aperture defining a light-admitting surface, a pair of substantially coextensive arcuate fingers integral with and depending from said second member and spaced apart in substantially axial alignment to receive said cylindrical member therebetween, each of said fingers having a light-emitting surface adjacent an outer peripheral edge of said cylindrical member so that light rays received at said light-admitting surface and conducted through said fingers pass through said light-emitting surfaces into said cylindrical member to illuminate the indicia thereon.

7. In combination, a movable cylindrical light-conducting member having indicia on the outer peripheral surface thereof, a second light-conducting member having an aperture formed therein for accommodating a source of illumination, the wall of the aperture defining a light-admitting surface, a pair of arcuate fingers integral with and depending from the main body portion of said second member and spaced apart on opposite sides of said cylindrical member along the axis of said cylindrical member, the juncture of said fingers with the main body portion of said second member being formed so as to funnel light rays from the source of illumination into the fingers, each of said fingers having a light-emitting surface adjacent to an outer peripheral edge of said second member so that light rays received at said light-admitting surface and conducted through the main body portion and the fingers of said second member are transmitted through said light-emitting surfaces into said cylindrical member to illuminate the indicia thereon.

8. In combination, a plurality of light-conducting indicating counters arranged side-by-side and having indicia thereon, a light-conducting member adapted to receive light rays from light source means and having a plurality of depending portions which receive said light rays and which straddle respective counters and extend along the peripheral edges of said respective counters, said depending portions having light-reflecting and light-emitting surfaces adjacent the peripheral edges of respective counters so that light rays received in said depending portions are directed out through said light-emitting surfaces into said counters to illuminate the indicia thereon.

9. In combination, a plurality of light-conducting indicating counters arranged side-by-side and having indicia thereon, a light-conducting member having a main body portion adapted to receive light rays from light source means, a plurality of parallel and spaced depending fingers integral with said body portion to receive said light rays from said main body portion, said fingers extending along the peripheral edges of said counters and being positioned so that there is one finger located on each side of said counters and there is only one finger between adjacent counters, the fingers between adjacent counters being common to said adjacent counters, said fingers having light-emitting surfaces disposed adjacent to peripheral portions of their respective adjacent counters so that light rays received in said fingers pass through said light-emitting surfaces into the respective adjacent counters for illuminating the indicia thereon.

10. In combination, a plurality of light-transmitting indicating counters arranged side-by-side and having indicia thereon, a plurality of arcuate light-transmitting members extending along at least a portion of the peripheral edges of said counters, each counter being flanked by a pair of said light-transmitting members, adjacent counters having only one of said arcuate members therebetween which is in common therewith, each pair of light-transmitting members having a common light-admitting portion, the intermediate light-transmitting member common to adjacent counters having a pair of light-reflecting surfaces formed thereon to direct light rays received at its light-admitting portion into the counters on each side of said intermediate light transmitting member thereby to illuminate the indicia thereon.

11. In combination, a plurality of light-transmitting indicating counters arranged side-by-side and having indicia thereon, a plurality of substantially coextensive arcuate light- transmitting members in substantially axial alignment and extending along at least a portion of the peripheral edges of said counters, each counter being flanked by a pair of said arcuate members, adjacent counters having only one of said arcuate members therebetween which is in common therewith, each pair of said arcuate members having a common light-admitting portion, each of the light-transmitting members along the outside peripheral edges of the end counters having a light-reflecting surface beveled to direct light rays received from its respective light-admitting portion into its respective end counter only, while the intermediate light-transmitting member common to adjacent counters has opposed light-reflecting surfaces beveled to direct light rays in opposite directions into the adjacent counters.

References Cited in the file of this patent

UNITED STATES PATENTS

| | | |
|---|---|---|
| 1,739,954 | DuPont | Dec. 17, 1929 |
| 2,214,595 | Rights | Sept. 10, 1940 |
| 2,561,885 | Prideaux | July 24, 1951 |
| 2,613,630 | McNairy | Oct. 14, 1952 |

FOREIGN PATENTS

| | | |
|---|---|---|
| 534,695 | Great Britain | Mar. 14, 1941 |